US008862823B1

(12) United States Patent
Glasco et al.

(10) Patent No.: US 8,862,823 B1
(45) Date of Patent: Oct. 14, 2014

(54) COMPRESSION STATUS CACHING

(75) Inventors: David B. Glasco, Austin, TX (US); Cass W. Everitt, Heath, TX (US); David Kirk Mcallister, Holladay, UT (US); Emmett M. Kilgariff, San Jose, CA (US); George R. Lynch, Raleigh, NC (US); James Roberts, Austin, TX (US); Karan Mehra, Cary, NC (US); Patrick R. Marchand, Apex, NC (US); Peter B. Holmqvist, Cary, NC (US); Steven E. Molnar, Chapel Hill, NC (US)

(73) Assignee: NVIDIA Corporation, Santa Clara, CA (US)

(*) Notice: Subject to any disclaimer, the term of this patent is extended or adjusted under 35 U.S.C. 154(b) by 1158 days.

(21) Appl. No.: 12/340,503

(22) Filed: Dec. 19, 2008

(51) Int. Cl.
    *G06F 12/00* (2006.01)
    *G06F 13/00* (2006.01)
    *G06F 13/28* (2006.01)

(52) U.S. Cl.
    USPC .......................................................... 711/118

(58) Field of Classification Search
    CPC .......... G06F 12/0862; G06F 2212/401; G06F 2212/6024
    USPC ...................................................... 711/118
    See application file for complete search history.

(56) References Cited

U.S. PATENT DOCUMENTS

| | | | | |
|---|---|---|---|---|
| 6,385,656 | B1 * | 5/2002 | Appelman | 709/247 |
| 7,225,297 | B2 * | 5/2007 | Heil | 711/137 |
| 8,219,508 | B2 * | 7/2012 | Mcmillen et al. | 706/12 |
| 2005/0144388 | A1 * | 6/2005 | Newburn et al. | 711/118 |
| 2005/0268046 | A1 * | 12/2005 | Heil | 711/137 |
| 2006/0047916 | A1 * | 3/2006 | Ying et al. | 711/144 |
| 2009/0063825 | A1 * | 3/2009 | McMillen et al. | 712/220 |
| 2009/0144492 | A1 * | 6/2009 | Barth et al. | 711/106 |
| 2010/0138614 | A1 * | 6/2010 | Glasco et al. | 711/144 |
| 2011/0087840 | A1 * | 4/2011 | Glasco et al. | 711/118 |

OTHER PUBLICATIONS

Rasmusson, et al. "Exact and Error-bounded Approximate Color Buffer Compression and Decompression," Graphics Hardware (2007), pp. 41-48.
Eggers, et al. "Simultaneous Multithreading: a Platform for Next-Generation Processors," IEEE Micro, vol. 17, No. 5, pp. 12-19, Sep./Oct. 1997.

* cited by examiner

*Primary Examiner* — Sheng-Jen Tsai
(74) *Attorney, Agent, or Firm* — Patterson & Sheridan, LLP

(57) ABSTRACT

One embodiment of the present invention sets forth a compression status cache configured to store compression information for blocks of memory stored within an external memory. A data cache unit is configured to request, in response to a cache miss, compressed data from the external memory based on compression information stored in the compression status bit cache. The compression status for active buffers is dynamically swapped into the compression status cache as needed. Different compression formats may be specified for one or more tiles within an active buffer. One advantage of the disclosed compression status cache is that a lame amount of attached memory may be allocated as compressible memory blocks, without incurring a corresponding die area cost because a portion of the compression status stored off chip in attached memory is cached in the compression status cache.

23 Claims, 10 Drawing Sheets

COMPRESSION STATUS CACHING

BACKGROUND OF THE INVENTION

1. Field of the Invention

The present invention generally relates to memory systems and more specifically to caching compression status for data stored in a memory system.

2. Description of the Related Art

Performance requirements are constantly increasing in data processing systems, which conventionally comprise one or more processor chips and attached memory devices. The processor chip includes on-chip data processing resources and memory interface circuitry configured to enable the processing resources to access off-chip, attached memory. System performance is generally determined by the on-chip data processing performance and available bandwidth to the attached memory devices.

One technique for increasing available memory bandwidth is to interleave memory access over two or more memory partitions. When multiple on-chip clients access memory within each partition, the associated access requests may be scheduled to optimize specific parameters, such as overall system throughput or average latency for a specific client. Clients of the memory system, such as on-chip data processing resources, may post memory access requests through a switched network to one or more memory partitions. A physical address associated with a memory access request is converted to a local partition address using an address mapping function that is specific to a given partition configuration.

To further improve memory bandwidth, some data may be stored in a compressed format, which reduces the number of bits needed to represent a block of original data. The amount of memory allocated to store a block of original data in a compressed format is not reduced compared to an uncompressed format, but the number of bits needed to store and retrieve the compressed block of data is reduced and therefore consumed memory bandwidth is reduced. A plurality of both loss-less and lossy compressed formats may be used, depending on specific application requirements and whether a specific block of original data is compressible under available compression algorithms. Each compression format advantageously reduces the number of bits needed to represent a block of original data stored in attached memory. However, the specific number of bits and how to interpret the bits is a function of which compression format, if any, is used to represent the block of original data. A selected compression format associated with each block is indicated by compression status bits for each block of compressible memory. In order to minimize bandwidth needed to access a given block of data within attached memory, the memory interface circuitry residing on the processor chip needs to refer to the compression status bits associated with the block of memory prior to initiating a memory access request to the attached memory.

To maximize performance, the compression status bits need to be available to the memory interface circuitry. One solution involves storing compression status bits in an on-chip random access memory (RAM), referred to herein as the compression status RAM, wherein the status bits map directly to blocks of memory within a region of compressible memory residing in the attached memory. In this solution, a given set of compression status bits within the compression status RAM indicates compression status for a directly corresponding block of physical memory within the attached memory. When the memory interface circuitry within a partition receives a memory access request, the memory interface circuitry queries the compression status RAM prior to initiating a memory access request to the attached memory.

As data processing systems increase in performance and expand overall capabilities, total attached memory is also conventionally increased. Because the on-chip compression status RAM directly map to compressible attached memory, increasing the amount of attached memory implies an increase in the size of the compression status RAM. For example, doubling the amount of attached memory should result in doubling the size of the compression status RAM to accommodate the additional blocks of potentially compressed memory. However, on-chip storage of compression status bits is relatively expensive in terms of die area and, unlike attached memory, can not be easily doubled.

Accordingly, what is needed in the art is a technique that enables a data processing system to support large amounts of attached storage without incurring die area costs that are associated with storing large numbers of directly mapped on-chip compression status bits.

SUMMARY OF THE INVENTION

One embodiment of the present invention sets forth a compression status cache configured to store compression information for blocks of memory stored within an external memory. A data cache unit is configured to request, in response to a cache miss, compressed data from the external memory based on compression information stored in the compression status bit cache. The compression status for active buffers is dynamically swapped into the compression status cache as needed. Different compression formats may be specified for one or more tiles within an active buffer. One advantage of the disclosed compression status cache is that a large amount of attached memory may be allocated as compressible memory blocks, without incurring a corresponding die area cost because a portion of the compression status stored off chip in attached memory is cached in the compression status cache.

Various embodiments of a method of the invention for storing compression status information for compressible surfaces include allocating storage in a data structure residing within an external memory for the compression status information for the compressible surfaces, wherein the compressible surfaces are represented as a collection of tiles and the data structure includes compression status bits for each one of the tiles. The data structure is initialized and a portion of the data structure that corresponds to a portion of the compressible surfaces that are accessed during execution of an application program is stored in a compression status cache of a processor. The processor is coupled to the external memory and configured to access a tile using the compression status bits corresponding to the tile.

Various embodiments of a method of the invention for accessing a compression status cache configured to store per-tile compression information for compressible surfaces include receiving a request to access a tile of a compressible surface. A cache line index corresponding to compression status information for the tile is determined, wherein the compression information includes compression status bits that encode a compression format used to represent data stored for the tile. Whether a cache line corresponding to the cache line index is stored in the compression status cache is determined and the cache line corresponding to the cache line index from the data structure is obtained when the cache line is not stored in the compression status cache.

Various embodiments of the invention include a processor comprising a compression status cache and a data cache. The compression status bit cache is configured to receive a request to access a tile of a compressible surface, determine a cache line index corresponding to compression status information for the tile, wherein the compression information includes compression status bits that encode a compression format used to represent data stored for the tile, and determine whether a cache line corresponding to the cache line index is stored in the compression status cache. The data cache is configured to obtain the cache line corresponding to the cache line index from a data structure when the cache line is not stored in the compression status cache. The external memory is coupled to the processor and configured to store the data structure and the tiles of compressible surfaces.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
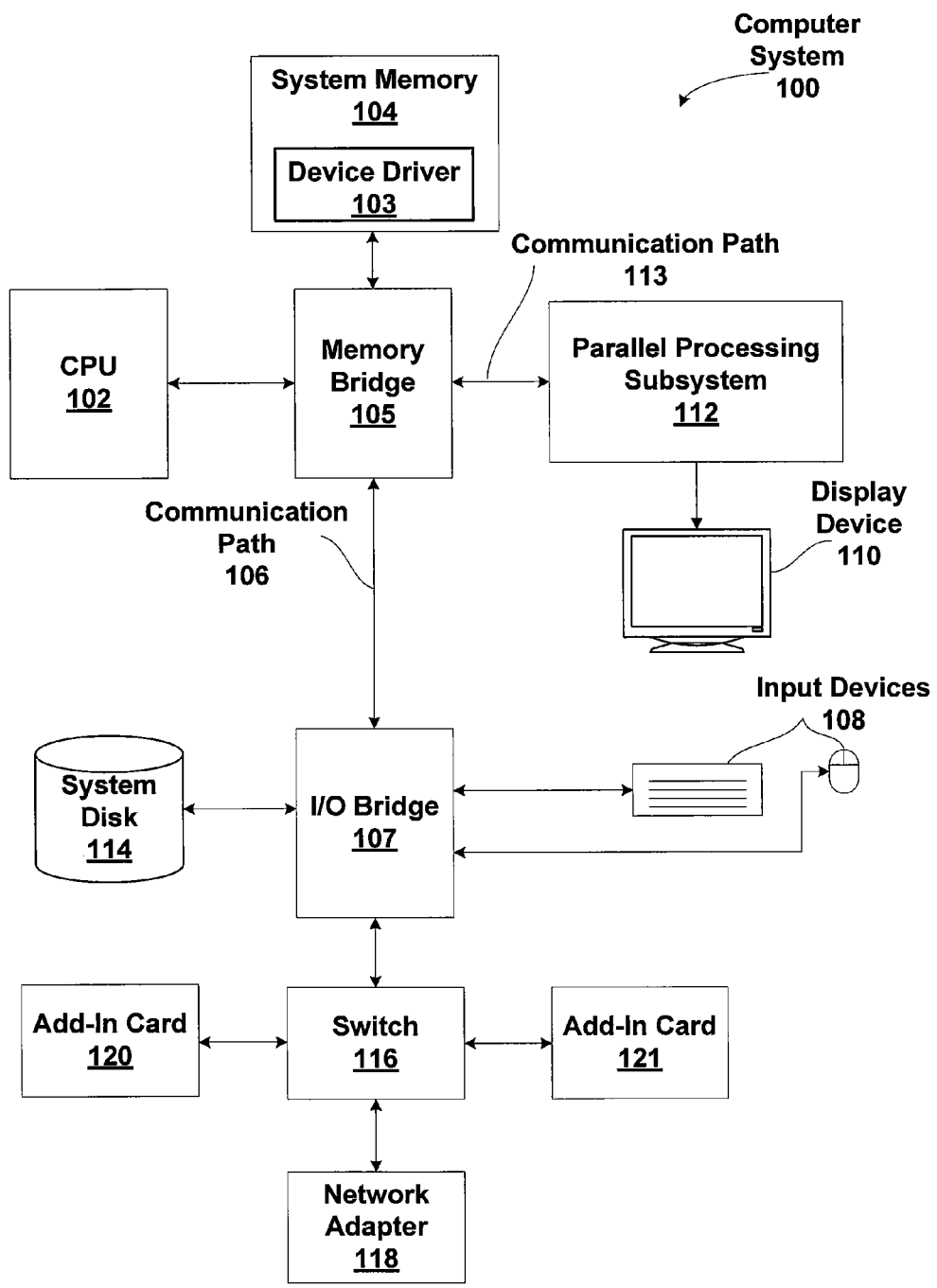
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
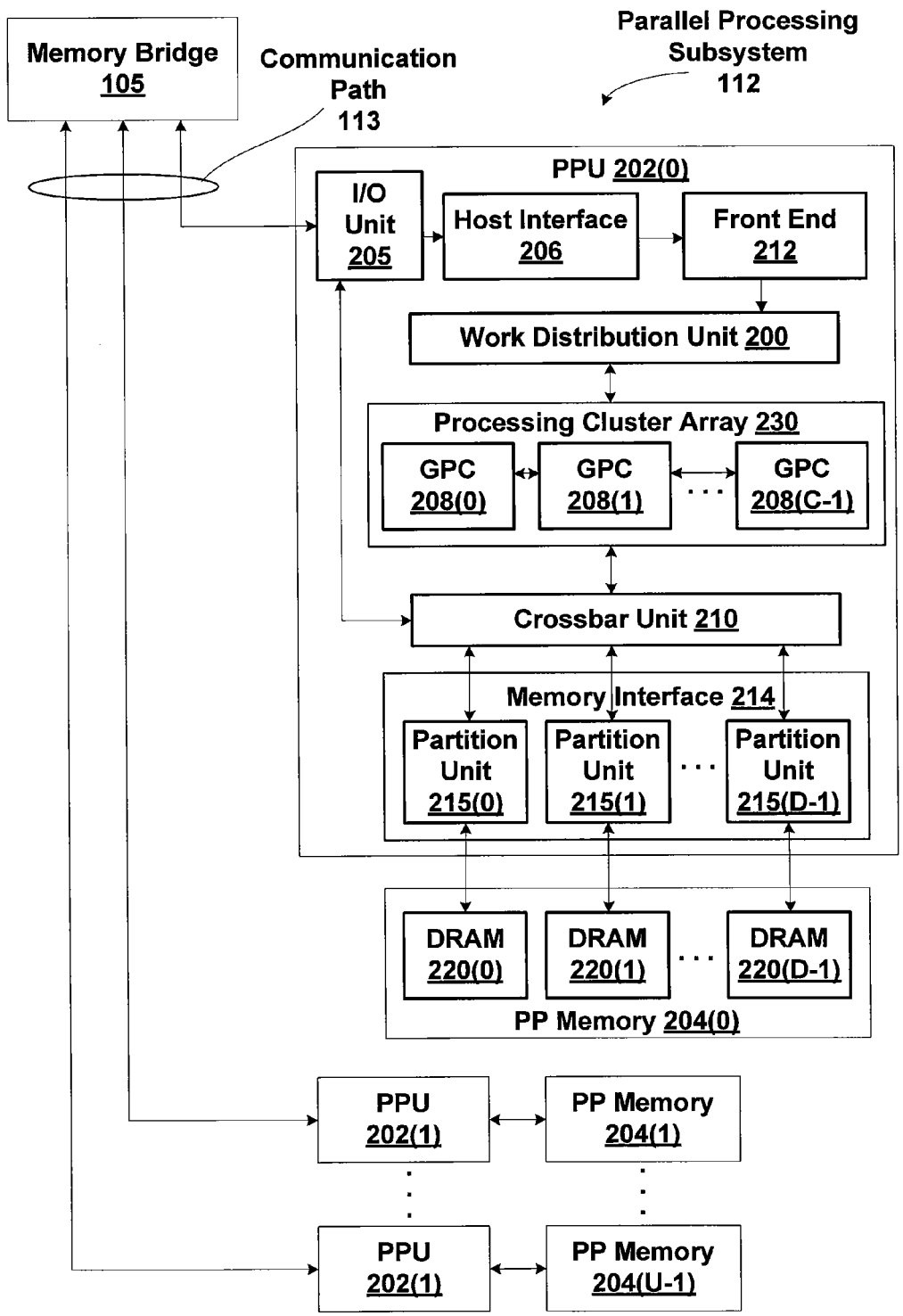
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device (s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 215 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 214 or to another GPC 208 for further processing. GPCs 208 communicate with memory interface 215 through crossbar unit 210 to read from or write to various external memory devices. In one embodiment, crossbar unit 210 has a connection to memory interface 215 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
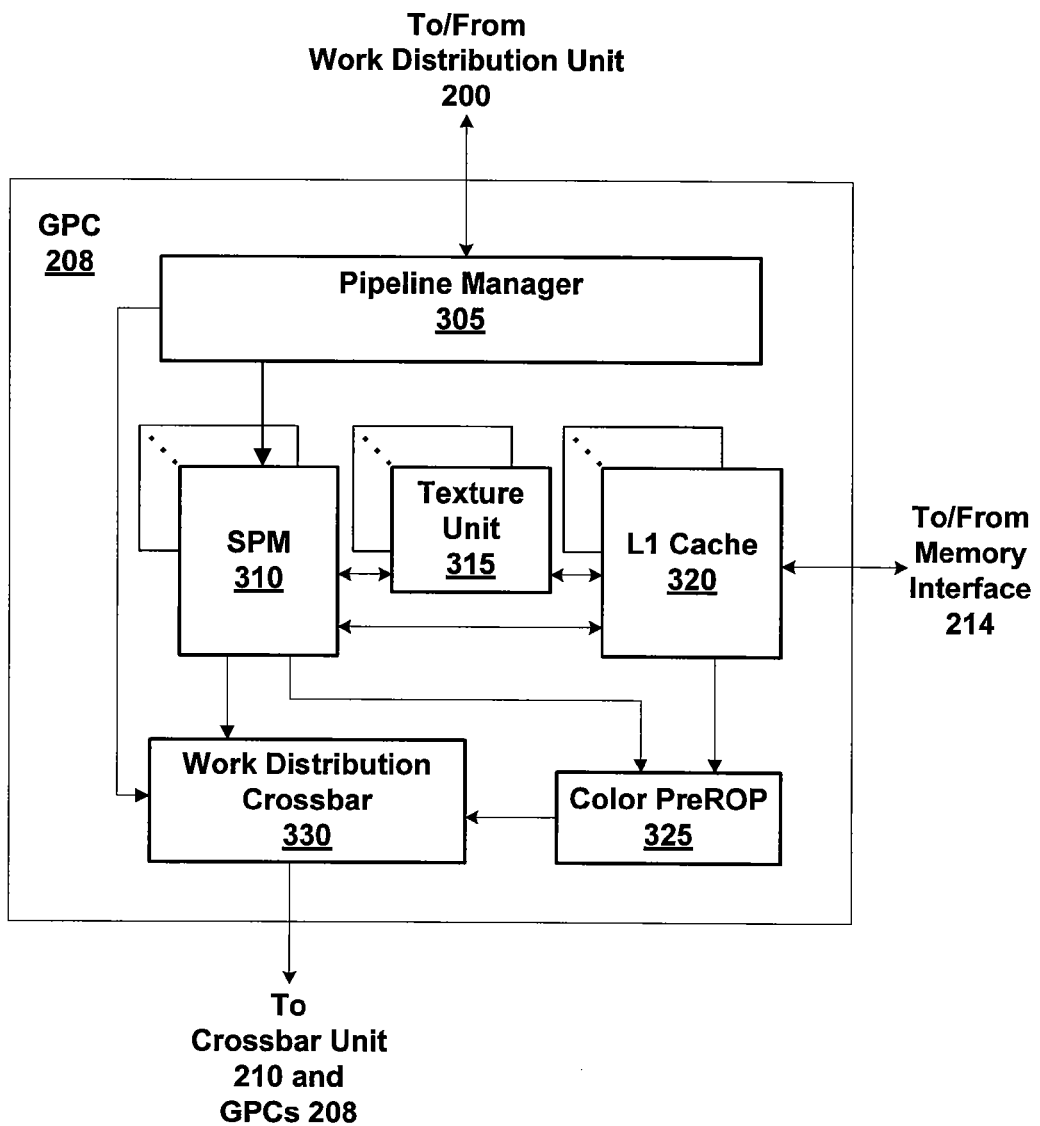
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine 304 for performing screen space graphics processing functions that may include, but are not limited to primitive setup, rasterization, and z culling. In some embodiments, primitive engine 304 is configured to gather pixels into tiles of multiple neighboring pixels before outputting the pixels to L1 cache 320 in order to improve the access efficiency of L1 cache 320. Primitive engine 304 receives a processing task from work distribution unit 200, and when the processing task does not require the operations performed by primitive engine 304, the processing task is passed through primitive engine 304 to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where $M \geq 1$, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
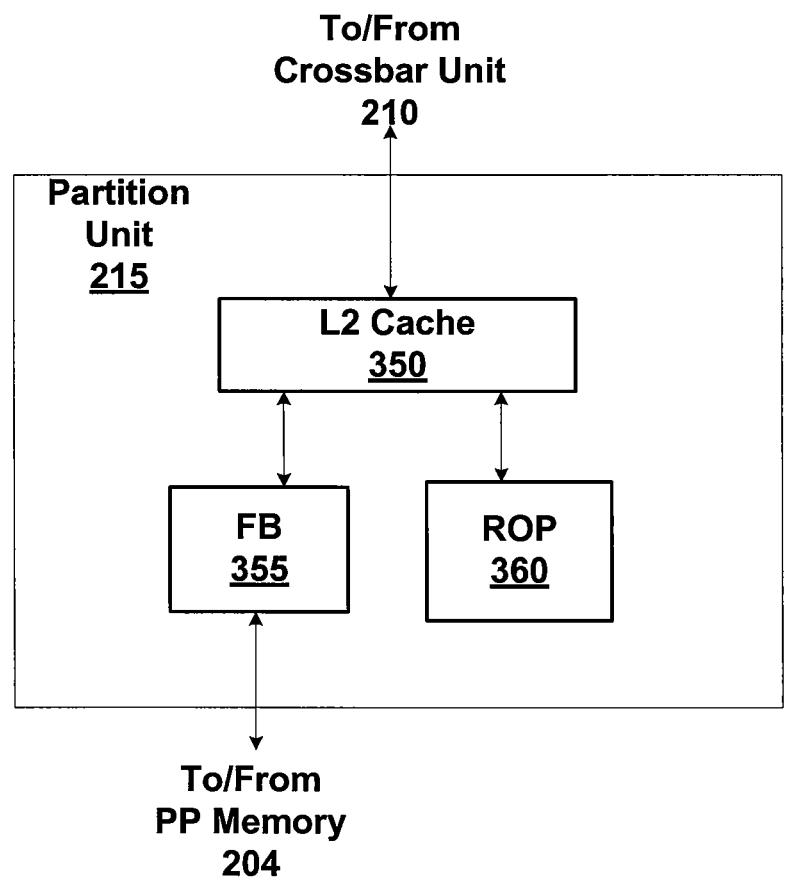
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. In some embodiments, L2 cache 350 may be split into four (or fewer) slices in order to interface with memory crossbar unit 210 at four times the bandwidth of FB 355. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Compression Status Cache

Figure 4:
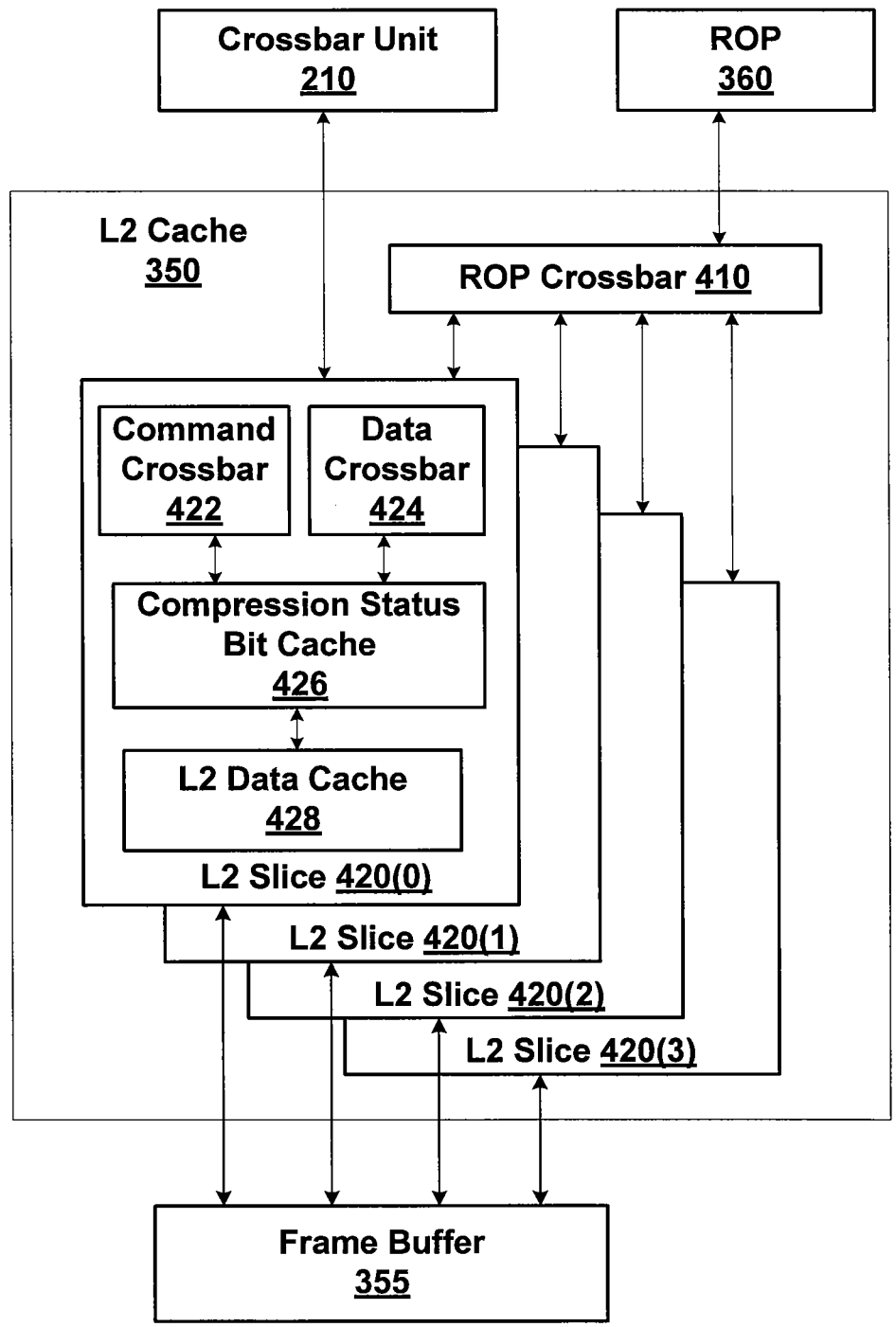
FIG. 4 is a conceptual diagram of the level two (L2) cache of FIG. 3B, according to one embodiment of the present invention.

FIG. 4 is a conceptual diagram of the level two (L2) cache 350 of FIG. 3B, according to one embodiment of the present invention. The L2 cache 350 comprises a ROP crossbar 410, and one or more L2 slices 420. In one embodiment, four L2 slices 420(0)-420(3) are included in the L2 cache 350. The L2 cache 350 receives memory access requests from a crossbar unit 210 and may receive memory access requests from at least one ROP 360. The memory access requests comprise read and write operations performed on memory blocks that may be associated with a data surface. The at least one ROP 360 presents memory access requests to the ROP crossbar 410, which distributes the requests to the L2 slices 420. In processing chips with two or more partition units, such as partition units 215 of FIG. 2, the crossbar unit 210 routes memory access requests to the two or more partition units, each including an instance of the L2 cache 350.

Each L2 slice 420 within each L2 cache 350 includes a command crossbar 422, a data crossbar 424, a compression status bit cache 426, and an L2 data cache 428. The command crossbar 422 directs a command portion of a memory access request to the compression status bit cache 426. The data crossbar 424 routes data between the compression status bit cache 426 and a memory client via the crossbar unit 210 or the ROP 360.

A backing store residing within an external DRAM, such as DRAM 220 of FIG. 2, comprises a data structure that should provide sufficient compression status bit sets to indicate compression status of all compressed memory blocks also residing in the DRAM. Each compression status bit set indicates compression status for a corresponding block of memory residing in external DRAM, which may be attached to the frame buffer 355. The compression status bit cache 426 stores cache lines from the backing store, wherein each cache line includes a plurality of compression status bit sets. One or more cache lines are organized into a cache data store, disposed within the compression status bit cache 426. If a compression status bit set associated with a memory access request from a memory client is not currently stored in the cache data store, then a compression status bit cache miss is generated. In response to a compression status bit cache miss, the compression status bit cache 426 generates a memory access request to the backing store to retrieve a cache line that includes the requested compression status bit set.

Compression status bits for the active set of data surfaces are dynamically swapped into compression status cache 426 as needed. The compression status cache 426 is sized to store the compression status corresponding to the active set of data surfaces in order to reduce the frequency of cache misses. Once device driver 103 has allocated compression status bits in the backing store for all of the compressible surfaces, the compression status cache 426 dynamically fetches and stores the compression status bits as needed. The latency of reading the compression status bits is reduced for those compression status bits that are stored in the compression status cache 426. The size of the compression status bit storage is not constrained by the size of compression status cache 426, so many surfaces may be represented in a compressible format.

The compression status bit cache 426 may implement any technically feasible tag association scheme and any technically feasible eviction policy. Under normal operation, a memory access request to a compressed surface will pass through the compression status bit cache 426 in order to determine compression status for the requested block of memory. Based on the compression status, a memory access request is forwarded to the L2 data cache 428 for processing. A cache hit in the L2 data cache 428 may be processed locally by the L2 data cache 428, while a cache miss in the L2 data cache 428 results in a memory access request being generated and posted to the frame buffer 355. Any technically feasible replacement policy and association mechanism may be used within the L2 data cache 428.

Importantly, if the L2 data cache 428 misses, only the number of bits needed by a compressed representation of surface data stored in a corresponding cache line needs to be requested by the L2 data cache 428. The number of bits needed for a memory request initiated by the L2 data cache 428 is indicated by a compression status bit set residing within the compression status bit cache 426. By limiting a memory request size to include only bits needed by a compressed representation of a requested block of memory, bandwidth demands on PP memory 204 are reduced. Another important benefit is that the compressed data occupies less space in the L2 data cache and increases the effective amount of data that can be cached on chip. In other words, the effective storage capacity of the L2 data cache 428 is increased when data is stored in a compressed format instead of an uncompressed format.

Certain memory clients, such as ROP 360, are compression aware and are able to directly read and write compressed data. Other clients are compression naïve and are not able to process compressed data directly. For example, the GPCs 208 of FIG. 2 are generally not equipped to process compressed data. If a compression aware memory client requests a read or write operation to a compressed block of memory, the L2 cache 350 may reply with compressed data. If, however, a compression naïve memory client requests a read from a compressed block of memory, the L2 cache 350 decompresses data within the compressed block of memory and returns decompressed data to the naïve memory client. In certain instances, a compression naïve memory client may only write uncompressed data back to any given block of memory. When the data format changes between various compressed and uncompressed formats, the compression status stored in compression status cache 426 is updated accordingly.

Figure 5:
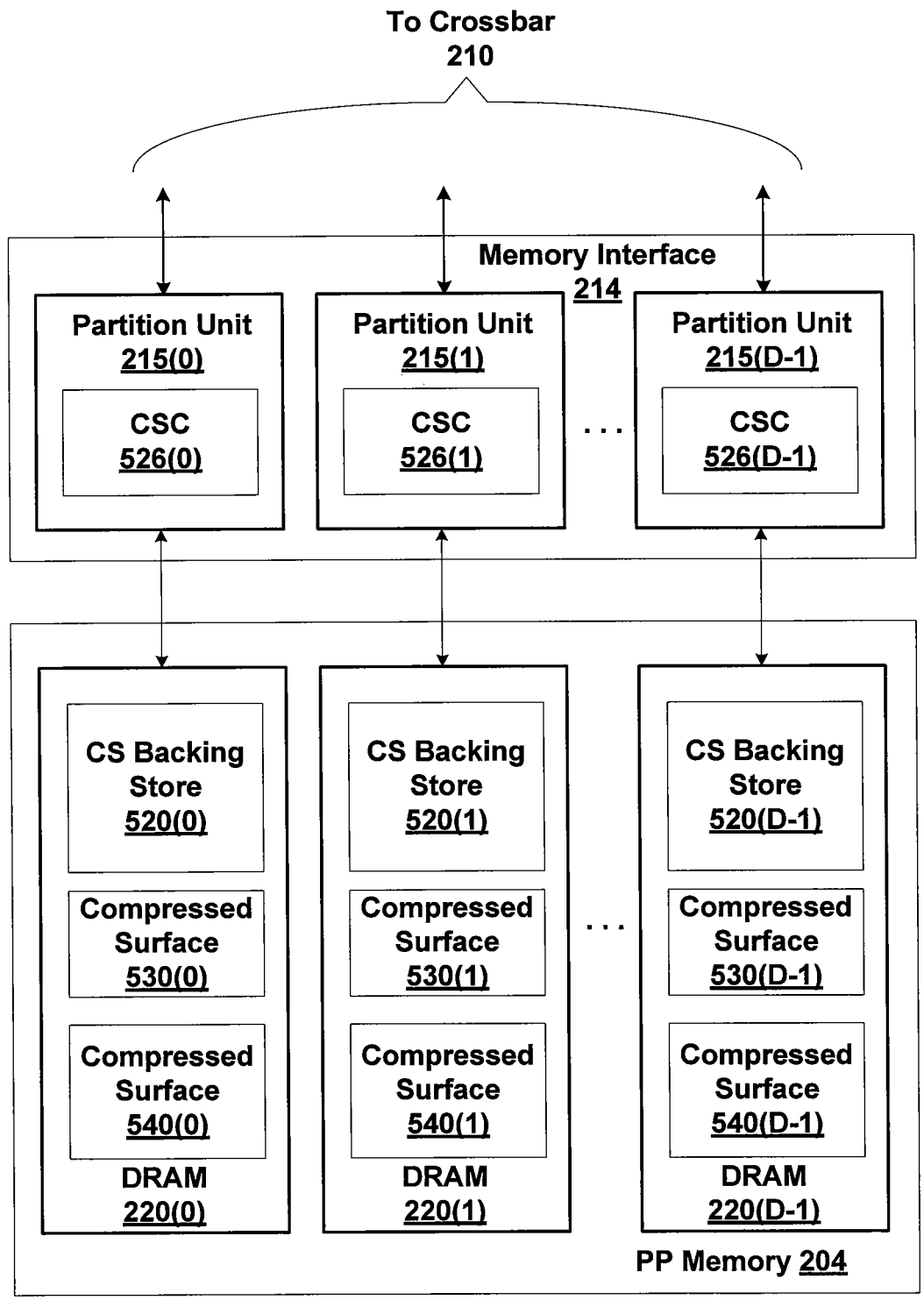
FIG. 5 illustrates allocation of compression status cache backing stores relative to partition association with attached parallel processor memory, according to one embodiment of the present invention.

FIG. 5 illustrates allocation of compression status backing stores 520 relative to partition association with attached parallel processor (PP) memory 204. Each partition unit 215 includes a compression status cache (CSC) 526 configured to provide an on-chip, cached version of compression status bits residing in a corresponding compression status (CS) backing store 520. Each CS backing store 520 is configured to store compression status bits that should map exclusively to blocks of data residing in the corresponding DRAM 220. For example, CS backing store 520(1) includes compression status bits that map exclusively to DRAM 220(1). Additionally, CS 526(1) caches compression status bits that map exclusively to CS backing store 520(1). By contrast, compressed surfaces 530 and 540 include data that is distributed over DRAM 220(0) through DRAM 220(D-1), within PP memory 204.

Persons skilled in the art will understand that by confining which DRAM 220 stores compression status bits for blocks of data residing in the same DRAM 220, significant additional traffic over crossbar 210 may be averted, while preserving enhanced memory performance gained by distributing normal memory access requests over multiple partitions.

Figure 6A:
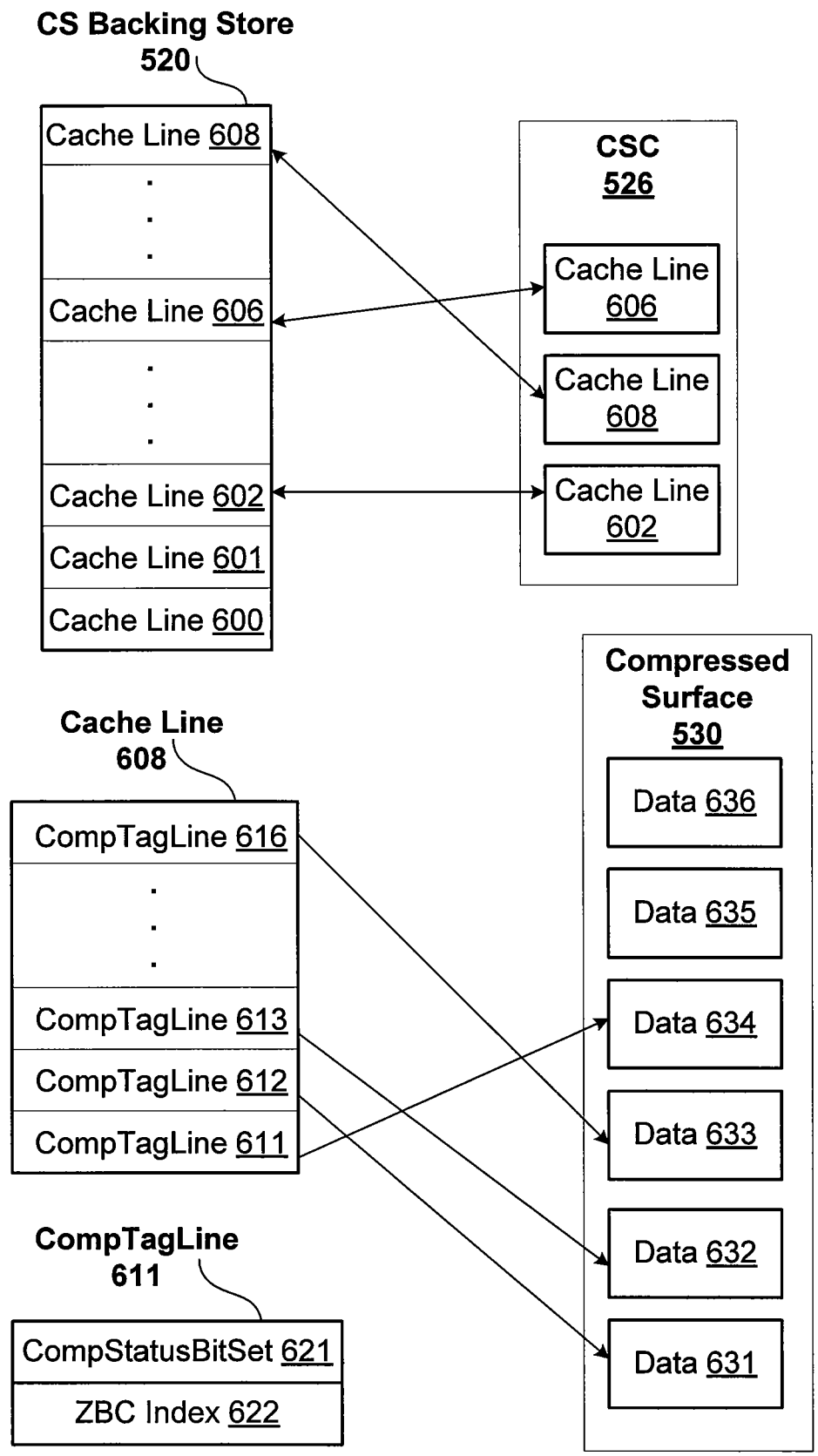
FIG. 6A is a conceptual diagram of the relationships between the surface data tiles, compression status cache line, and L2 slices, according to one embodiment of the present invention.

FIG. 6A is a conceptual diagram of the relationships between the surface data tiles, compression status cache line, and CS backing store 520, according to one embodiment of the present invention. CS backing store 520 comprises multiple cache lines of compression status bits, e.g., cache lines 600, 601, 602, 606, and 608. A portion of the cache lines stored in CS backing store 520 are stored in CSC 526, e.g., cache lines 602, 606, and 608. In some embodiments of the present invention, CSC 526 is configured to store 16 cache lines, and each cache line is 512 bytes. Using a large cache line size simplifies the addressing computation and reduces fragmentation. Since CS backing store 520 is stored off-chip, the number of cache lines in CS backing store 520 is independent of the number of cache lines in CSC 526.

Each cache line, such as cache line 608 shown in FIG. 5A stores a sequential range of compression tag lines. Each compression tag line, such as compression tag line 611, includes compression information for multiple tiles of surface data, e.g., compression status bit sets 621 and optionally, a shared zero-bandwidth clear (ZBC) index 622. When ZBC indices are stored in CSC 526, the ZBC indices are also stored in CS backing store 520. As shown in FIG. 6A each compression tag line in cache line 608 maps to an arbitrary physical address corresponding to a group of several tiles of surface data. Compression tag line 611 stores compression information for surface data 634, compression tag line 612 stores compression information for surface data 631, compression tag line 613 stores compression information for surface data 632, and compression tag line 616 stores compression information for surface data 633.

In one embodiment, two bits comprise one compression status bit set, wherein each compression status bit set can assume one of four code values given by the two bits. One code value may be used to indicate that a corresponding block of memory is not compressed, while each of the remaining three code values may indicate one of three different compression formats. In other embodiments of the present invention, fewer or more bits comprise one compression status bit set. Since a compression bit set is stored for each tile of surface data, each tile may store surface data that is compressed using a different compression format or that is not compressed.

ZBC index 622 references a clear value that is stored in a table. The number of bits that are stored for ZBC index 622 corresponds to the number of clear values that are stored in the table, e.g., a four bit index is used for a table storing up to 16 clear values. Rather than storing an index for each tile, a ZBC index may be stored for a group of tiles. In some embodiments of the present invention, one of the tile's compression bit set values (ZBC clear flag) indicates that the data is cleared to a clear value that is stored in the table at the location indicated by the comptagline's ZBC index. The ZBC index indicates the clear value that a tile's data is cleared to when the tile's ZBC clear flag indicates that the tile is zero-bandwidth cleared. One index value may be reserved to indicate that no tile references the index so that the ZBC clear flag for the tiles sharing an index do not need to be examined to determine that none of the tiles are zero-bandwidth cleared. In one embodiment of the present invention, when the data for the tile is set to the clear value and the clear flag indicates that the tile is cleared, the data for the tile is not stored in the external memory.

Storing ZBC indices to indicate that surface data is cleared to a clear value reduces the bandwidth between partition units 215 and PP memory 204, since the clear values are not actually transferred to PP memory 204 to write the data or transferred from PP memory 204 to read the data. The data of a ZBC cleared tile is known from the compression bit set, the ZBC index and the ZBC clear value table and does not consume space in the L2 data cache. This frees up cache lines in the data cache to store other data.

Figure 6B:
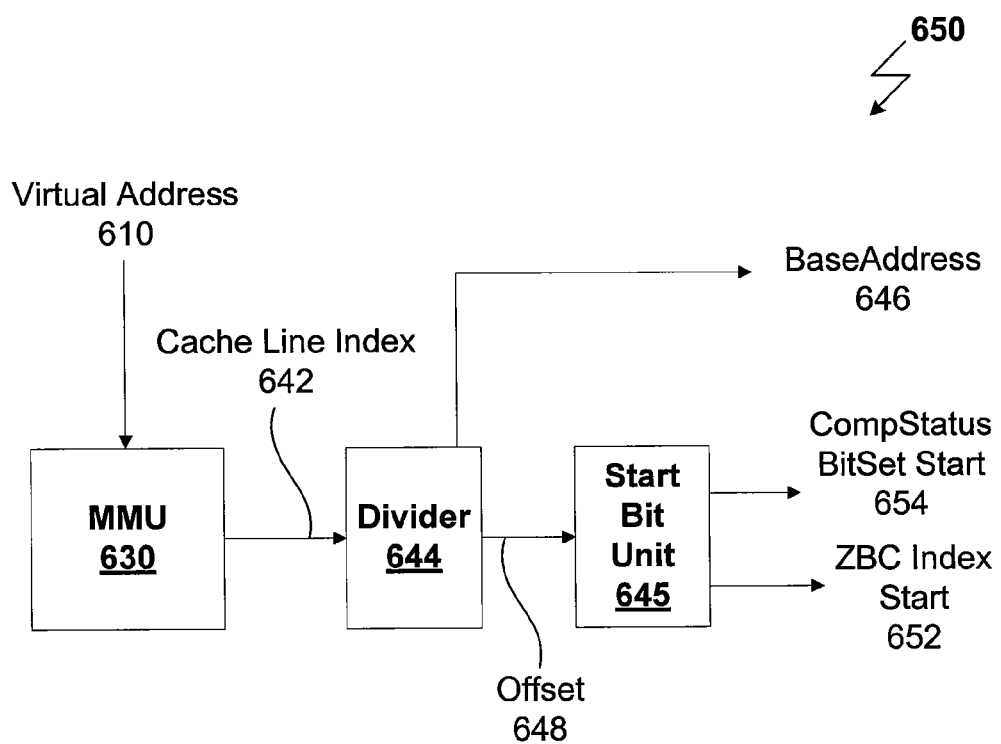
FIG. 6B is a conceptual diagram of a virtual address to compression status cache line address generation pipeline, according to one embodiment of the present invention.

FIG. 6B is a conceptual diagram of a virtual address to CSC 526 address generation pipeline 650, according to one embodiment of the present invention. The virtual address to CSC 526 address generation pipeline 650 includes a memory management unit (MMU) 630, a divider 644, and a start bit unit 645. In one embodiment, each GPU 208 of FIG. 2 includes an MMU unit.

The MMU 630 includes a set of page table entries (PTEs) used to map a virtual address 610 to a physical address of a tile and a cache line address of CSC 526. Each PTE includes, without limitation, virtual address to physical address mapping information, surface kind information, and a compression tag line information. The physical address is processed to distribute surface data access locality to allow efficient request interleaving among partition units. The cache line index 642 is derived from the compression tag line information generated by the MMU 630. The cache line index 642 associates a block of compressed memory to a set of associated compression status bits. The cache line index 642 also serves as a lookup tag used by the CSC 526 of FIG. 5 to determine whether of not a request for a cache line is a hit or miss. A cache line index 642 is arithmetically added to a base address of CS backing store 520 to compute a slice-specific physical address that may be processed by L2 data cache 528 and may be used to access a specific DRAM 220 device.

The divider 644 receives the cache line index 642 and generates a quotient and remainder that are used by the CSC 526 to locate compression status bits and ZBC indices within a cache line. The quotient is a base address 646 for CSC 526. The quotient is computed by dividing the cache line index 642 by the number of compression tag lines per cache line. The number of compression tag lines per cache line varies based on the number of L2 slices 420. The remainder is an offset 648 that is used to locate compression status information for surface data within the cache line.

The offset 648 may be compared with thresholds corresponding to rows within the cache line, where the thresholds vary based on the number of partitions in PPU 202. Offset 648 is received by the start bit unit 645 and the compression status bit set start 654 and ZBC index start 652 are output. The compression status bit set start 654 indicates the location of the compression status bit set for an individual surface data tile and the ZBC index start 652 indicates the location of the ZBC index for the surface data tile.

Figure 7A:
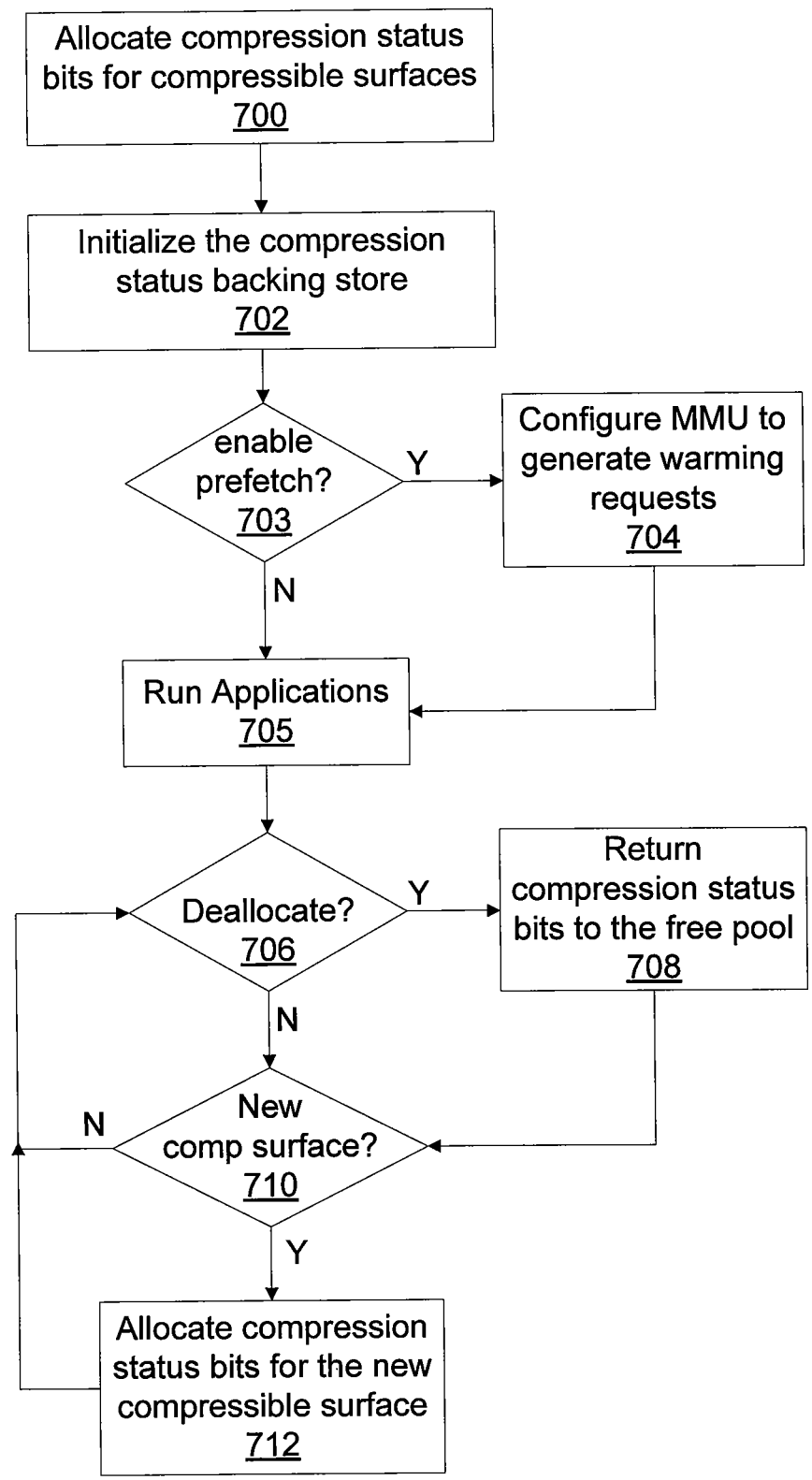
FIG. 7A is a flow diagram of method steps for configuring the compression status backing store and compression status cache, according to one embodiment of the present invention.

FIG. 7A is a flow diagram of method steps for configuring the CS backing store 520 and the CSC 526, according to one embodiment of the present invention. In step 700 the device driver 103 allocates compression status bits in the CS backing store 520 for all compressible surfaces. When zero-bandwidth clearing operations are used, the device driver 103 also allocates bits for storing ZBC indices in the CS backing store 520. Examples of compressible surfaces that may be specified for an application program include a 2560×1600 pixel z-buffer with eight 4-byte samples/pixel, a 2560×1600 pixel color buffer with eight 8-byte samples/pixel, and six 2000× 2000 pixel shadow maps with one 4-byte sample/pixel, and a 2560×1600 pixel display buffer with one 4-byte sample/pixel.

In step 702 the device driver 103 initializes the CS backing store 520 by storing predetermined values for the allocated compression status bits and ZBC indices. In step 703 the device driver 103 determines if prefetching should be enabled for the CSC 526, and, if not device driver 103 proceeds directly to step 705. Otherwise, in step 704 the device driver 103 configures the MMU to generate warming requests to the CSC 526 when a compressed surface is accessed, before proceeding to step 705.

The warming requests are broadcast to the L2 slices 520 several clock cycles earlier than the actual access of the compressed surface, and the warming request does not cause the CSC 526 to output compression status bits or ZBC indices since the purpose is simply to prefetch a needed cache line from the CS backing store 520 that is not resident in the CSC 526. The CSC 526 may be configured to use a least-recently-used replacement policy in order to retain compression status information for portions of the active surfaces that are being accessed.

In step 705 the application programs are run on the computer system 100. In step 706 the device driver 103 determines if any of the compression status bits (and bits for storing ZBC indices) for the compressible surfaces should be deallocated. If any of the bits should be deallocated, then in step 708 the device driver 103 returns those bits to the free pool before proceeding to step 710. In step 710 the device driver 103 determines if any new compressible surface needs an allocation of compression status bits (and bits for storing ZBC indices) in the CS backing store 520, and, if not, the device driver 103 returns to step 706. Otherwise, in step 712 the device driver 103 allocates compression status bits (and bits for storing ZBC indices) in the CS backing store 520 for the new compressible surface before returning to step 706.

The allocation and unallocation of compression bits follows naturally from the way an application allocates physical memory. For example, at startup, the application is assigned physical memory and the MMU PTE tables are initialized. Compression bits are assigned to compressible physical memory through the comptagline field in the PTE. Each PTE maps both the data memory and the associated compression bits. When the application is terminated, the application's physical memory is freed, the corresponding PTE entries are removed, and the associated comptaglines are freed.

Figure 7B:
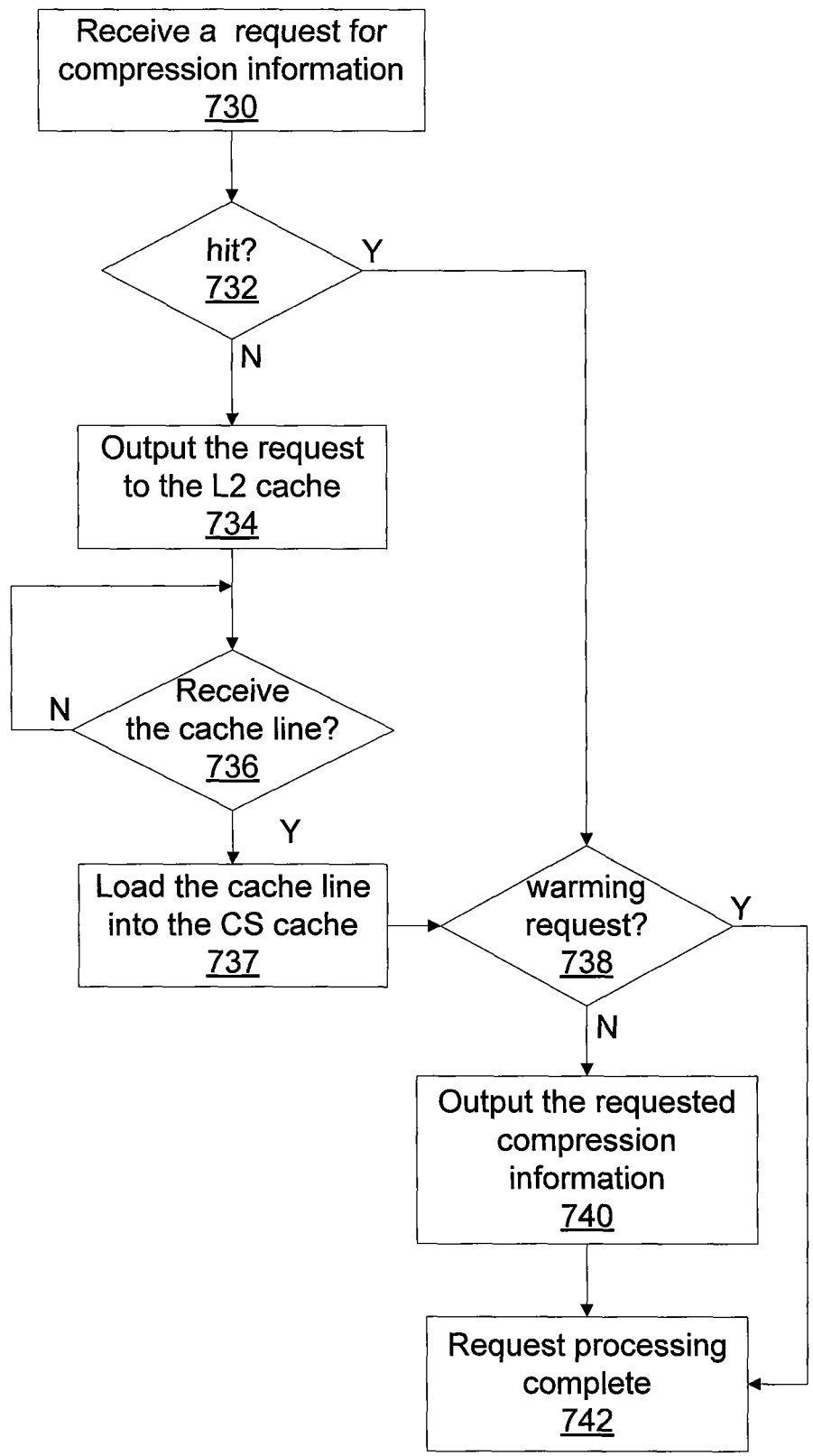
FIG. 7B is a flow diagram of method steps for dynamically maintaining the compression status cache, according to one embodiment of the present invention.

FIG. 7B is a flow diagram of method steps for dynamically maintaining the CSC 526, according to one embodiment of the present invention. In step 730 the CSC 526 receives a request for compression information (compression status bits and/or ZBC indices) for a compressible surface. In step 732 the CSC 526 determines if there is a cache hit, indicating that the cache line storing the requested compression information is resident in the CSC 526. If, in step 732, the CSC 526 determines that there is not a cache hit, then the request is a cache miss, and in step 734 the CSC 526 outputs a request for the cache line to the L2 data cache 528. The cache line may be returned to the CSC 526 from the L2 data cache 528 or from the CS backing store 520. In step 736 the CSC 526 waits for the cache line, and when the cache line is received, the CSC 526 proceeds to step 737 and loads the cache line into an available cache line entry. If a cache line entry is not available, then the CSC 526 may evict a cache line. When the cache line is stored in the CSC 526, the CSC 526 proceeds to step 738.

To handle a cache miss, the CSC 526 creates a free cache line before it issues the miss request. This ensures that the returned miss data can be stored immediately. A cache line can be considered free if it stores no data or if it holds clean data (i.e. data that has not been updated after it was read from the CS backing store 520) and no request is currently referencing the cache line. The CSC 526 uses an LRU (least recently used) replacement policy and two programmable thresholds to ensure clean cache lines are available. When the number of free cache lines falls below the first threshold, the CSC 526 starts cleaning dirty cache lines. When the number of clean cache lines fall below the second threshold, further dirtying (i.e. write requests) are blocked until a dirty cache line has been freed.

If, in step 732, the CSC 526 determines that there is a cache hit, then the CSC 526 proceeds directly to step 738. In step 738 the CSC 526 determines if the request was a warming request, and, if so, in step 742 processing of the request is complete. Otherwise, in step 740 the CSC 526 outputs the requested compression information before proceeding to step 742, so that a read or write access of a compressible tile may be performed.

In sum, a technique for enabling a data processing system to support large amounts of attached storage without incurring die area costs is disclosed. A compression status cache is coupled to a backing store residing in external memory. The compression status bits and ZBC indices are stored in the backing store for each block of memory stored within the same physical partition. The compression status cache 526 is sized to store the compression status corresponding to the active set of data surfaces in order to reduce the frequency of cache misses. Once the device driver 103 has allocated bits for storing compression status and ZBC indices in the backing store for all of the compressible surfaces, the compression status cache 526 will dynamically load the compression status as needed to reduce the latency of reading the compression status bits from the CS backing store 520. The size of the CS backing store 520 is not constrained by the size of the CSC 526, so many surfaces may be represented in a compressible format.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of storing compression status information for compressible surfaces, the method comprising:

allocating storage in a data structure residing within an external memory for the compression status information for the compressible surfaces, wherein the compressible surfaces are represented as a collection of tiles and the data structure includes compression status bits for each one of the tiles;

initializing the data structure; and storing a portion of the data structure corresponding to a portion of the compressible surfaces that are accessed during execution of an application program in a compression status cache of a processor that is coupled to the external memory, wherein the compression status cache uses a quotient and a remainder to locate the compression status bits within a cache line, wherein the processor is configured to access a tile using the compression status bits corresponding to the tile, and the compression status information for a tile includes a zero bandwidth clear index that references a clear value stored in a table, and wherein data for the tile is set to the clear value and the data for the tile is not stored in the external memory when a clear flag indicates that the tile is cleared.

2. The method of claim 1, wherein the compression status cache is configured to receive, from a memory management unit, a cache line index that is used to determine whether the compression status information needed to access the tile is stored in the compression status cache.

3. The method of claim 2, wherein the cache line index resides within a page table entry that is stored within the memory management unit and is generated during a virtual address to physical address translation performed by the memory management unit.

4. The method of claim 2, wherein the compression status cache is configured to read a cache line that includes the compression status information for the tile from the data structure when the compression status information for the tile is not stored in the compression status cache.

5. The method of claim 1, further comprising the step of configuring the processor to generate warming requests to prefetch the compression status information for storage in the compression status cache without outputting the compression status information in response to the warming requests.

6. A method of accessing a compression status cache configured to store per-tile compression information for compressible surfaces, the method comprising:

receiving a request to access a tile of a compressible surface;

determining a cache line index corresponding to compression status information for the tile, wherein the compression status information includes compression status bits that encode a compression format used to represent data stored for the tile, and a zero bandwidth clear index that references a clear value stored in a table, and wherein data for the tile is set to the clear value and the data for the tile is not stored in the external memory when a clear flag indicates that the tile is cleared;

determining whether a cache line corresponding to the cache line index is stored in the compression status cache, wherein the compression status cache uses a quotient and a remainder to locate the compression status bits within the cache line; and obtaining the cache line corresponding to the cache line index from the data structure when the cache line is not stored in the compression status cache.

7. The method of claim 6, further comprising the step of generating a warming request to prefetch the cache line corresponding to the cache line index for storage in the compression status cache without outputting the compression status information in response to the warming request.

8. The method of claim 7, further comprising the step of outputting the compression status bits for the tile when the request is not a warming request.

9. The method of claim 6, wherein the compression status bits for the tile of the compressible surface specify a different format than other compression status bits for a different tile of the compressible surface.

10. The method of claim 6, further comprising the step of converting data that is written to the tile to the compression format encoded by the compression status bits.

11. The method of claim 6, further comprising the step of converting data that is read from the tile from the compression format encoded by the compression status bits.

12. A computing device, comprising:
a processor that includes a compression status cache and a data cache, the compression status bit cache configured to:
receive a request to access a tile of a compressible surface;
determine a cache line index corresponding to compression status information for the tile, wherein the compression status information includes compression status bits that encode a compression format used to represent data stored for the tile, and a zero bandwidth clear index that references a clear value stored in a table, and wherein data for the tile is set to the clear value and the data for the tile is not stored in the external memory when a clear flag indicates that the tile is cleared; and
determine whether a cache line corresponding to the cache line index is stored in the compression status cache, wherein the compression status cache uses a quotient and a remainder to locate the compression status bits within a cache line; and
the data cache configured to obtain the cache line corresponding to the cache line index from a data structure when the cache line is not stored in the compression status cache; and
the external memory that is coupled to the processor and configured to store the data structure and the tiles of compressible surfaces.

13. The computing device of claim 12, wherein the data cache is further configured to, in response to a cache miss, read compressed data for the tile of the compressible surface from the external memory based on the compression status information associated with the request and stored in either the compression status cache or the data structure, wherein the compressed data comprises a reduced set of data for representing the tile.

14. The computing device of claim 12, wherein the processor includes a memory management unit that is configured to provide a cache line index to the compression status cache that is used to determine whether the compression status information needed to access the tile is stored in the compression status cache.

15. The computing device of claim 12, wherein an effective storage capacity of the data cache is increased when data is stored in a compressed format instead of an uncompressed format.

16. The computing device of claim 12, further comprising a device driver that is configured to allocate storage for the data structure to store compression status information for compressible surfaces, wherein the compressible surfaces are represented as a collection of tiles and the data structure includes compression status bits for each one of the tiles.

17. The computing device of claim 16, wherein the device driver configures the processor to generate warming requests to cause the compression status cache to prefetch the compression status information for storage in the compression status cache without outputting the compression status information in response to the warming requests.

18. The method of claim 1, wherein a reserved value of the zero bandwidth clear index indicates that no tile in a set of tiles references the index when tiles in the set of tiles share the zero bandwidth clear index.

19. The method of claim 6, wherein a reserved value of the zero bandwidth clear index indicates that no tile in a set of tiles references the index when tiles in the set of tiles share the zero bandwidth clear index.

20. The computing device of claim 12, wherein a reserved value of the zero bandwidth clear index indicates that no tile in a set of tiles references the index when tiles in the set of tiles share the zero bandwidth clear index.

21. The computing device of claim 12, wherein a divider receives a cache line index to generate the quotient and remainder used by the compression status cache.

22. The computing device of claim 12, wherein the quotient is a base address for the compression status cache, and is computed by dividing the cache line index by a number of compression tag lines per cache line.

23. The computing device of claim 12, wherein the remainder is an offset that is used to locate compression status information for surface data within the cache line.

* * * * *

UNITED STATES PATENT AND TRADEMARK OFFICE
CERTIFICATE OF CORRECTION

| | | |
|---|---|---|
| PATENT NO. | : 8,862,823 B1 | Page 1 of 1 |
| APPLICATION NO. | : 12/340503 | |
| DATED | : October 14, 2014 | |
| INVENTOR(S) | : Glasco et al. | |

It is certified that error appears in the above-identified patent and that said Letters Patent is hereby corrected as shown below:

Title Page, item (75) Inventors:

Please delete "Mcallister" and insert --McAllister-- therefor;

Title Page, item (57) Abstract:

Line 12, please delete "lame" and insert --large-- therefor.

Signed and Sealed this
Twenty-fourth Day of February, 2015

Michelle K. Lee
*Deputy Director of the United States Patent and Trademark Office*